May 31, 1955  C. V. TEMPLE ET AL  2,709,800
POWER LINE FAULT DETECTOR

Filed March 10, 1953  3 Sheets-Sheet 1

INVENTORS
Robert J. Owens
Clarence V. Temple
BY R. Hoffman
Attorney

INVENTORS
Robert J. Owens
Clarence V. Temple
By R. Hoffman
Attorney

May 31, 1955   C. V. TEMPLE ET AL   2,709,800
POWER LINE FAULT DETECTOR

Filed March 10, 1953   3 Sheets-Sheet 3

INVENTORS
Robert J. Owens
Clarence V. Temple
BY
R. Hoffman
Attorney

United States Patent Office 2,709,800
Patented May 31, 1955

2,709,800

POWER LINE FAULT DETECTOR

Clarence V. Temple and Robert J. Owens,
Chattanooga, Tenn.

Application March 10, 1953, Serial No. 341,627

5 Claims. (Cl. 340—253)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to electrically operated detecting and signaling devices. More particularly, it relates to over-current signaling relays and power line fault detectors which are useful in the location of short-circuit causing faults.

The location of accidental faults along long transmission or rural distribution lines is usually difficult to determine by ordinary methods. Continuous inspection by patrolling such a line throughout its length requires considerable time and expense. Also, the sectionalizing of conductors and the testing of separate portions thereof require appreciable time and expensive line switches.

It is therefore an object of this invention to provide an improved device for determining the location of line trouble causing short circuit.

It is another object of this invention to provide a signal device adapted to be permanently attached to power line conductors and be capable of automatic time delayed resetting after each operation from excess current flow.

It is a further object to provide an over-current signaling device which will automatically reset itself after normal flow of current has been re-established for any appreciable time.

It is still a further object to provide a device which will indicate a total number of consecutive periods of over-current such as occur when a persisting short circuit is repeatedly interrupted by a power line circuit breaker.

Other objects will become apparent from the following description of the invention and from the accompanying drawings, in which like numbers in the different views refer to the same parts.

Figure 2:
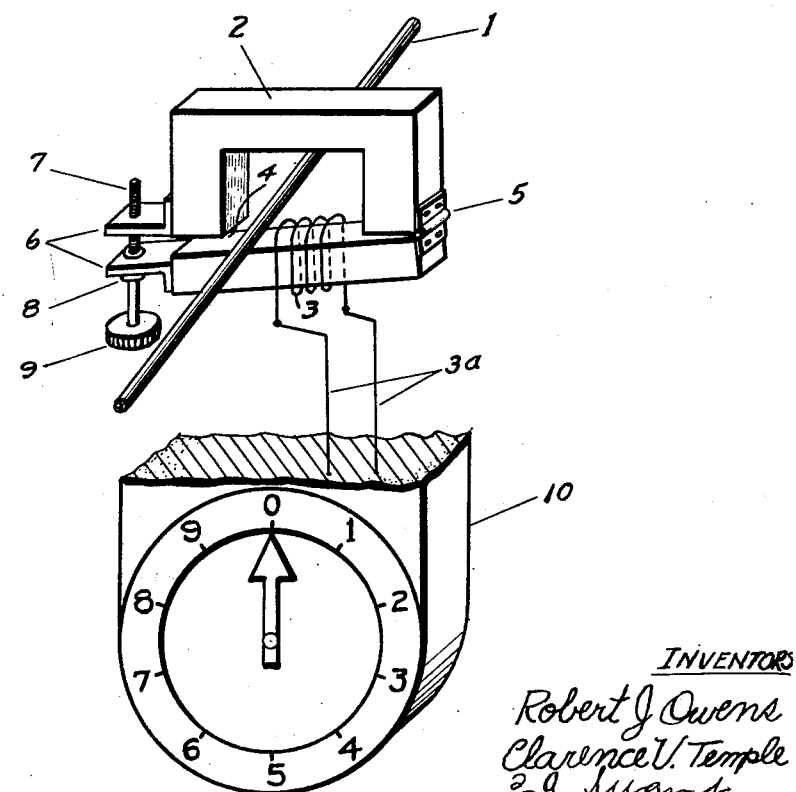
Figure 2 is a diagrammatic showing of details of the method of attachment of the device to a power line and the means for providing the necessary current to operate the indicating portion of the device.
Figure 3:
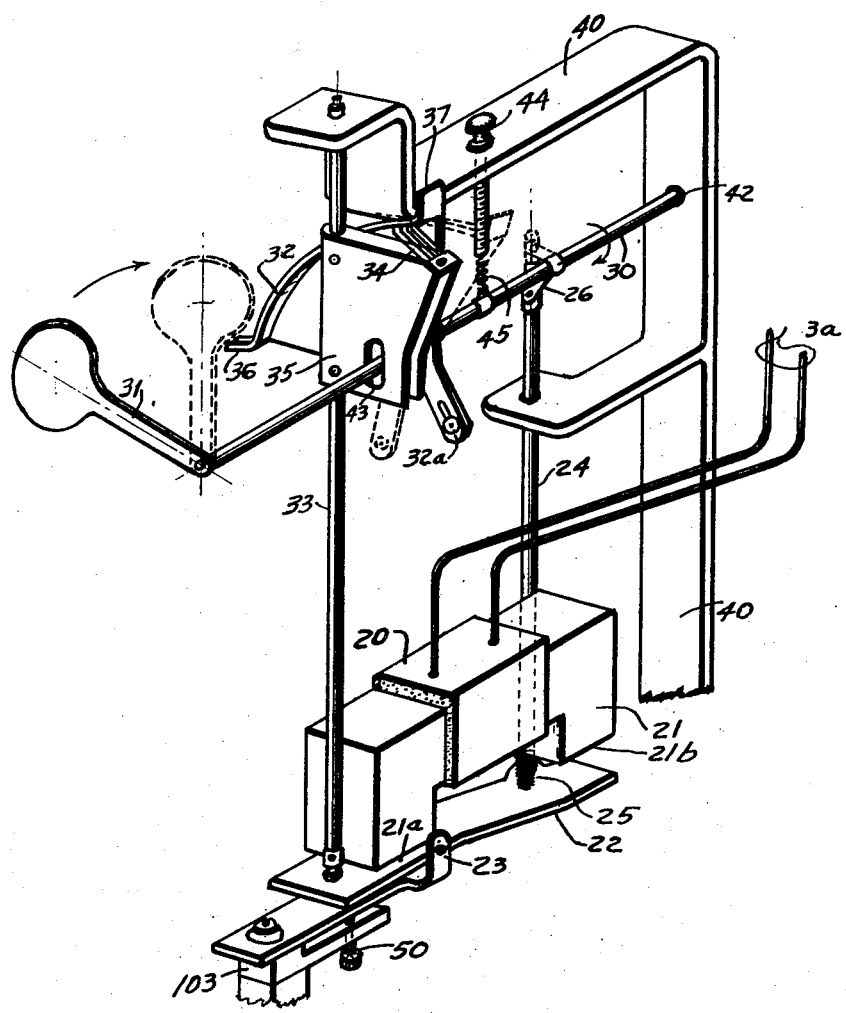
Figure 3 is a detailed diagrammatic showing of a single step indicator and of its working parts.
Figure 4:
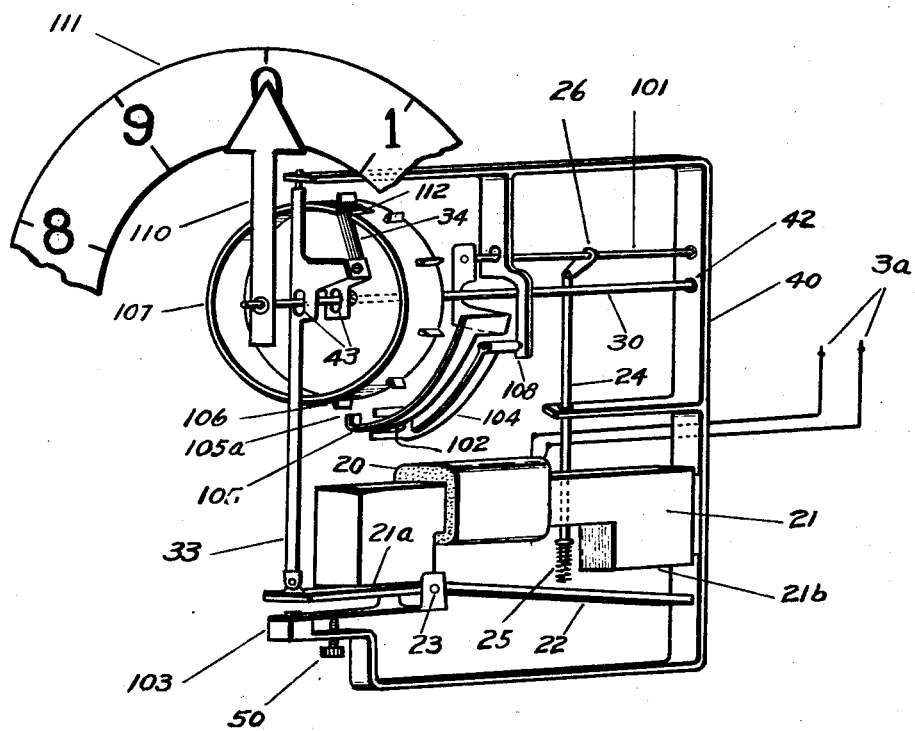
Figure 4 is a detailed diagrammatic showing of a modification so constructed as to indicate a plurality of consecutive over-current surges.

As is evident from Figures 2, 3, and 4 the device consists of two parts, namely, a transformer-like portion that inductively reacts to both normal and over-current flow and an indicator portion actuated by the currents induced in the first-mentioned transformer-like portion. No direct electrical connections are required between the device and the power line; the only coupling being an inductive one.

Details of the transformer-like portion are shown in Figure 2.

The power line 1, which serves as the transformer primary, may pass through the core 2. This may be accomplished by designing the upper portion of transformer core so that it has a hook-shaped cross-section. The core may then merely be suspended from the power line to obtain effective coupling. Also on the core is a secondary winding 3, which supplies an induced current to the indicator 10 through circuit 3a. The core may be split to provide an adjustable air gap 4, as shown. However, the core may be solid, and through which the line conductor may be threaded in single or multiple turns, depending upon the normal line current and the desired induced current. The gap of the split core may be adjustable, as shown, to provide adjustment in installations where a large normal current flows in the conductor. Thus, it may be hinged, as by hinge 5, and provided with a pair of lugs 6, the upper lug being threaded to engage bolt 7, and the other drilled large enough to accommodate the bolt, but small enough to provide a seat for collar 8, fixed to bolt 7. By turning knurled knob 9 the size of gap 4 may be adjusted.

The operation of the single step form of indicator may be readily understood by reference to Figure 3. Current induced in the secondary winding 3 flows in circuit 3a through coil 20 of electromagnet 21, which is rigidly mounted in any desired manner on frame 40. Mounted near the pole faces 21a and 21b of the electromagnet 21 is an armature 22 pivoted at 23 with a joint that allows vertical motion to the armature. The armature has two kinds of motion, depending on whether the current in circuit 3a is induced by an over-current in line 1, or by the normal current flowing in line 1. When an overload current flows through coil 20, the armature is drawn up against pole faces 21a and 21b of core 21, giving a relatively long upward motion to rod 24. This rod is provided with a cushion spring 25 which prevents a hammer blow against it. The vertical motion of 24 transmits a rotary motion to bell crank 26 which is rigidly connected to motor shaft 30. This shaft is rotatably mounted on frame 40 by means of bearing 42. The motion of the bell crank causes shaft 30 to rotate in a clockwise direction, together with target 31 and motor track segment 32, which is provided with counterweight 32a, and which is also rigidly mounted on shaft 30. The upward force of rod 24 also causes a slight upward movement of shaft 30 and segment 32 in the slotted bearings 43 attached to rod 33. This movement lifts the motor track from normal contact with wire fingers 34. It is thus seen that, motion in the armature 22 caused by an over-current surge, results in moving the target 31 from the set position (solid line) to the tripped position (dotted line). After the surge of over-current, the armature 22 drops to its normal position, and motor track segment 32 drops downward, leaving the track again in contact with wire fingers 34.

Upon restoration of normal current in the power line, a small steady alternating current is induced in circuit 3a. This current is insufficient to draw armature 22 up against the electromagnet; but it is sufficient to produce an alternating magnetic field. The armature is so constructed as to be tuned to the frequency of the induced alternating current, commonly 60 cycles. The sensitivity of the armature response and its resonance frequency can be adjusted by varying the distance between the armature and pole faces 21a and 21b by means of knurled screw 50 working in bracket 103. When the current is normal, the armature remains in its normal position, but vibrates up and down in response to each half cycle of line current. This vibration is transmitted to operating rod 33, which has rigidly connected thereto a set of stiff wire fingers 34 mounted on part 35, which in turn is rigidly mounted on rod 33. Since the armature is out of contact with rod 24, the shaft 30 and motor track segment are in their lowermost position in the slotted bearing 43. In this position the wire fingers 34 are in contact with the concave surface of the motor track segment. The vibration in the armature is transmitted to the wire fingers through rod 33 and induces a walking action by the fingers against the concave face of the motor track segment, causing it to be moved counter-clockwise from the tripped to the set position. This resets the target 31. The segment is provided with limit stops 36 and 37 which contact the frame 40 and limit the angle through which the target rotates from the set to trip position and vice versa.

The indicator described above is designed to indicate only one surge of short circuit current and then reset automatically when normal service is resumed.

However, in some installations means are provided for resetting power line circuit breakers that have opened when a temporary surge of current, not necessarily caused by short circuit, occurred. In the case of a persisting short circuit the current will be repeatedly interrupted by the circuit breaker. By means of a modified form of the above-described indicator it is possible to count the number of times that the line circuit breaker is caused to operate.

Such an instrument is shown in Figure 4. In this modification the arrangement of the transformer portion, electromagnet 21, push rod 24, pivoted armature 22, and operating rod 33 is essentially the same as that in the single step indicator shown in Figure 3. However, instead of push rod 24 rotating the signal together with the motor track segment, the rod rotates shaft 101 which is rigidly connected with ratchet 105. As shaft 101 rotates under the influence of an over-current power surge, ratchet 105 turns in a clockwise direction, guiding step-limiting pawl 104 by means of slot 102. The toe 105a of the ratchet is thus given a kicking action against tooth 106 of motor track 107, thus causing track 107 to rotate clockwise, and at the same time to be lifted clear of wire fingers 34. Step-limiting pawl is hinged at 108; and as the ratchet toe lifts to kick one of the teeth, the pawl is simultaneously lifted so that the sides of slot 102 engage the next oncoming tooth. In this manner rotation of the motor track is restricted to a single step for each surge of current, permitting subsequent over-current surges to rotate the motor track through additional steps in a similar manner. In this way it is possible to record the number of times it was attempted to re-establish service before the short circuit condition required a shut-down for repair. The maximum number of indications will depend on the number of teeth.

When normal current conditions are restored, the instrument will automatically reset itself to the zero position. This action is similar to that in the single step indicator described above. After the initial power surge which results in the motor shaft 30 being raised away from wire fingers 34 by the kicking action of the ratchet, the shaft 30 resumes its normal position at the bottom of slotted bearings 43, and replaces the inner surface of annular motor track 107 in contact with wire fingers 34. Upon resumption of normal alternating current flow in power line 1, a small constant alternating secondary current flows in circuit 3a which energizes the electromagnet 21. This causes armature 22 to vibrate once every half cycle. These vibrations are transmitted to rod 33 which carries the wire fingers 34, and produces a walking action by these fingers on the inner surface of the annular motor track 107. As a result, the motor track is caused to rotate counter-clockwise until the pointer 110, which is attached to the motor track, reaches a position opposite the zero on the indicator dial 111. At this point there is provided a slot 112 in the motor track which engages the wire teeth and brings the resetting counter-clockwise rotation to a stop. The instrument is now ready to indicate a subsequent accidental short circuit.

As in the single step modification shown in Figure 3, the armature 22 in the multiple step indicator is pivoted at 23, and is supported by a spring mounted armature pivot-spring assembly 103 tuned by means of nut 50 to a frequency corresponding to that of the line.

In Figure 3 the pressure of the wire fingers against motor track segment 32 is adjusted by means of screw 44 connected to motor shaft 30 through spring 45.

Figure 1:
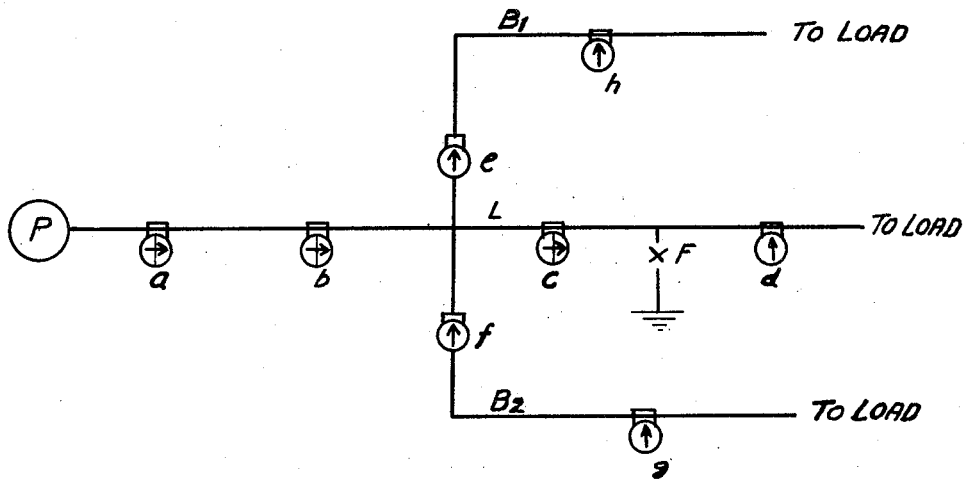
Figure 1 illustrates an electrical power transmission system provided with the novel fault indicators at selected stations.

To illustrate the manner in which the instrument is used, reference is made to the diagram in Figure 1. In this diagram a power source P is situated to provide power along main transmission line L and branch lines $B_1$ and $B_2$. Fault indicators are placed as shown at stations $a$, $b$, $c$, $d$, $e$, $f$, $g$, and $h$. Assuming an accidental short circuit at point F, between stations $c$ and $d$, the line will suddenly be made to carry an abnormally high current between the source of power and fault F. In the small interval between the occurrence of the break and the opening of the line by means of the circuit breakers, the surge of current will have tripped all of the indicators between the power station P and the fault F. Thus, as illustrated, indicators $a$, $b$, and $c$ will trip, but the remaining indicators will not be affected and will continue to read zero. To locate the break, all that is necessary is for an observer to travel along the line and watch for the tripped indicators. As soon as he comes to one untripped indicator after a series of tripped ones, he knows that the fault must be located between the last tripped indicator and the first untripped one. When the break is repaired and normal service resumed, the tripped instruments automatically reset themselves, as described above.

We claim:

1. A power line fault indicator comprising a transformer core adapted to mount on a power line conductor, said core having a secondary winding and an electromagnet connected to said winding; an armature pivotally mounted near the pole faces of said electromagnet, said electromagnet being adapted to strongly attract said armature during surges of over-current in the power line but only to induce a vibratory motion in tune with the line frequency when there is normal current flow in the power line conductor; a rotatable shaft carrying indicating means rigidly mounted at one end thereof; means linking one end of said armature and said shaft, said means adapted to convert linear motion in the armature to rotary motion in one direction in the shaft to indicate a surge of over-current; and second means linking the other end of said armature and said shaft, said second means adapted to convert vibratory motion in the armature to rotary motion in the opposite direction in the shaft to restore the indicator to a position showing resumption of normal current flow.

2. A power line fault indicator comprising a transformer core having a secondary winding and means for inductively coupling said secondary winding to a power line; an electromagnet connected to said secondary winding; an armature pivotally mounted near the pole faces of said electromagnet; said electromagnet being adapted to strongly attract the armature during a surge of over-current due to short circuit in the power line but to only induce a vibratory motion in tune with the line frequency during periods of normal line current flow; a rotatable shaft having indicating means rigidly mounted at one end thereof and an annular track segment also rigidly mounted on said shaft adjacent said indicating means; a first longitudinally rigid means connecting one end of the armature with crank means rigidly mounted on the shaft and adapted to impart a unidirectional rotary motion to said shaft when the armature is strongly attracted to the electromagnet; a second longitudinally rigid means connecting the other end of said armature with the aforementioned annular track segment through resilient contact means rigidly mounted on the end of said second longitudinally rigid connecting means at the end thereof opposite to that in contact with the armature; said resilient means engaging said annular track segment and being adapted to impart thereto a rotary motion opposite in direction to that imparted by the first longitudinally rigid connecting means during periods of vibratory motion in the armature; the annular track segment being provided with limit stops to restrict the angle through which it may be rotated.

3. A power line fault indicator comprising a transformer core having a secondary winding and means for inductively coupling said secondary winding to a power line; an electromagnet connected to said secondary winding; an armature pivotally mounted near the pole faces of the electromagnet, said electromagnet being adapted to strongly attract the armature during a surge of overcurrent due to short circuit in the power line but to only induce a vibratory motion in tune with the line frequency during periods of normal line current flow; a first rotatable shaft having indicator means rigidly mounted at one end thereof; a calibrated stationary circular concentric dial disposed immediately behind said indicator means; an annular track rigidly mounted on the aforementioned first rotatable shaft; said annular track having a series of teeth extending outwardly from the periphery thereof; a second rotatable shaft disposed parallel to the first rotatable shaft; ratchet means rigidly mounted on said second rotatable shaft adapted to engage the teeth on the annular track; a hinged pawl having a slotted end opposite the hinged end, the aforementioned ratchet means operating in said slot and guiding said pawl toward or away from the annular track, the sides of said slotted end being adapted to engage the teeth on the annular track and limit the angle of rotation thereof; a first longitudinally rigid means connecting one end of the aforementioned armature with crank means rigidly mounted on the second rotatable shaft and adapted to impart a unidirectional rotary motion to said second shaft when the armature is strongly attracted to the electromagnet; a second longitudinally rigid means connecting the other end of the armature with the annular track through resilient contact means rigidly mounted on the end of second longitudinally rigid connecting means at the end thereof opposite to that in contact with the armature; said resilient means engaging the inner surface of the annular track and being adapted to impart thereto a rotary motion opposite in direction to that imparted by the first longitudinally rigid connecting means during periods of vibratory motion in the armature; the annular track being provided with a slot in a position corresponding to the zero position on the dial, said slot being adapted to engage the aforementioned resilient contact means to stop the rotary motion of the annular track.

4. A power line fault indicator comprising a transformer core adapted to mount on a power line conductor and having a secondary winding; an electromagnet connected to said secondary winding; a pivoted armature resiliently mounted with one end near a pole face of said electromagnet, said electromagnet being adapted to strongly attract the armature during a surge of overcurrent in the power line conductor but to only induce a vibratory motion in tune with the line frequency when there is normal current in the line conductor; a first means for transmitting motion from the armature to indicating means when the armature is strongly attracted; a second means for transmitting motion from the armature to move the indicating means in the opposite direction from that provided by said first means, the second means including a resilient contact engaging a track connected to the indicating means and adapted to convert the vibratory motion of the armature, induced by normal line current, into extended unidirectional motion which is transmitted to the indicating means; and stop means provided on the track segment and indicating means to limit the extent of rotation of said indicating means and track segment in either direction.

5. A power line fault indicator comprising a transformer core adapted to mount on a power line conductor, said core having a secondary winding and an electromagnet connected to said winding; an armature pivotally mounted near the pole faces of said electromagnet, said electromagnet being adapted to strongly attract the armature during surges of over-current in the power line but only to induce a vibratory motion in tune with the line frequency when there is normal current flow in the power line conductor; a rotatable shaft having means for indicating a surge of over-current mounted at one end thereof; an annular track rigidly mounted on said shaft; crank means also rigidly mounted on said shaft; a first longitudinally rigid means connecting one end of the armature with said crank means, said first longitudinally rigid means being adapted to transmit motion from the armature to the shaft and to the indicating means mounted on said shaft to cause said shaft and indicating means to rotate when said armature is strongly attracted to the electromagnet during a surge of over-current; a second longitudinally rigid means connecting the other end of the armature with the annular track through resilient means rigidly mounted on the end of the second longitudinally rigid connecting means at the end thereof remote from the armature, said resilient means engaging said annular track and adapted to impart to said track and to the shaft a unidirectional motion, opposite to that imparted by the first longitudinally rigid means, when normal line current induces a vibratory motion in the armature.

References Cited in the file of this patent

UNITED STATES PATENTS

| | | |
|---|---|---|
| 2,006,179 | Price et al. | June 25, 1935 |
| 2,018,459 | Menger | Oct. 22, 1935 |
| 2,495,448 | Fehr | Jan. 24, 1950 |
| 2,528,744 | Fehr | Nov. 7, 1950 |
| 2,651,030 | Gardner | Sept. 1, 1953 |